United States Patent
Meadow, Jr. et al.

(10) Patent No.: US 7,224,252 B2
(45) Date of Patent: May 29, 2007

(54) ADAPTIVE MAGNETIC LEVITATION APPARATUS AND METHOD

(75) Inventors: William D. Meadow, Jr., Jacksonville, FL (US); William D. Meadow, Jacksonville, FL (US); Peter J. Berkelman, Grenoble (FR)

(73) Assignee: Magno Corporation, Jacksonville, FL (US)

( * ) Notice: Subject to any disclaimer, the term of this patent is extended or adjusted under 35 U.S.C. 154(b) by 162 days.

(21) Appl. No.: 10/860,128

(22) Filed: Jun. 4, 2004

(65) Prior Publication Data

US 2004/0244636 A1 Dec. 9, 2004

Related U.S. Application Data

(60) Provisional application No. 60/476,173, filed on Jun. 6, 2003.

(51) Int. Cl.
*H01F 7/00* (2006.01)
(52) U.S. Cl. .................. 335/296; 335/306; 310/12; 104/281; 104/286
(58) Field of Classification Search ........ 335/296–306; 104/281–286; 310/12–14
See application file for complete search history.

(56) References Cited

U.S. PATENT DOCUMENTS

| | | | |
|---|---|---|---|
| 3,927,620 A * | 12/1975 | Clapham | .................... 104/282 |
| 4,535,278 A * | 8/1985 | Asakawa | .................... 318/687 |
| 4,555,650 A * | 11/1985 | Asakawa | .................... 318/135 |
| 5,168,183 A | 12/1992 | Whitehead | |
| 5,251,741 A | 10/1993 | Morishita et al. | |
| 5,628,252 A | 5/1997 | Kuznetsov | |
| 5,631,618 A | 5/1997 | Trumper et al. | |
| 5,649,489 A | 7/1997 | Powell et al. | |
| 5,886,432 A | 3/1999 | Markle | |
| 6,072,251 A | 6/2000 | Markle | |
| 6,285,097 B1 * | 9/2001 | Hazelton et al. | .............. 310/12 |
| 6,357,359 B1 | 3/2002 | Davey et al. | |
| 6,684,794 B2 | 2/2004 | Fiske et al. | |

OTHER PUBLICATIONS

Inductrack Passive Magnetic Levitation, obtained on May 27, 2004 from www.skytran.net/press/sciam02.htm, 8 pages.
Build a Halbach Array—And a One-sided Refrigerator Magnet!, obtained on May 27, 2004 from www.matchrockets.com/ether/halbach.html, 6 pages.

\* cited by examiner

*Primary Examiner*—Ramon M. Barrera
(74) *Attorney, Agent, or Firm*—Foley & Lardner LLP

(57) ABSTRACT

A magnetic levitation system, includes a base module having a plurality of coils spaced in a matrix configuration. The system also includes a platform module having a plurality of focusing magnets and a plurality of lifting magnets. Activation of the plurality of coils by way of an electric current supplied to the plurality of coils creates a magnetic field strength which provides a force that levitates the platform module over the base module. The system also includes a position and orientation sensing and feedback system provided on the platform module.

7 Claims, 7 Drawing Sheets

ADAPTIVE MAGNETIC LEVITATION APPARATUS AND METHOD

RELATED APPLICATIONS

This application claims priority to Provisional Patent Application Ser. No. 60/476,173, by William D. Meadow, Jr. et al., which was filed on Jun. 6, 2003, and which is incorporated in its entirety herein by reference.

BACKGROUND OF THE INVENTION

A. Field of the Invention

The present invention relates generally to the field of magnetic levitation. More particularly, the present invention relates to an adaptive magnetic levitation apparatus and method that includes a base array of computer-controlled electromagnets, for providing movement of a levitated platform in two or three dimensions.

B. Background

The principle of magnetic levitation has been in use for several years. For example, magnetic levitation has been used for providing rail travel throughout different regions in Europe and in Japan, whereby such use of magnetic levitation is currently being investigated for efficacy in the United States.

In more detail, magnetic levitation of trains is a proven technology for high speed transport of heavy objects. The physics by which objects are levitated by way of repulsive force of same-polarity magnets is well known in the art. Stability along a linear axis of a rail is applied by varying the magnetic flux with electromagnets provided along portions of the rails.

It is desired to utilize magnetic levitation for different commercial purposes, such as in the field of entertainment, such as for simulating riding over different terrains using a board-like platform unit.

SUMMARY OF THE INVENTION

One aspect of the present invention provides for a magnetic levitation system that includes a magnetic platform and a magnetic base.

Another aspect of the present invention provides for a magnetic platform that allows one to move in a levitating manner from one location to another location across a base array of electromagnets on a two dimensional surface.

Yet another aspect of the present invention provides for a magnetic base that allows one to move, by way of a platform disposed over the magnetic base, in a levitating manner from one location to another location.

Still another aspect of the present invention provides for a magnetically levitated enclosed platform, hereinafter also referred to as a pod or a Magnopod, which allows one to move in a levitating manner while at a same time being immersed in a particular audio and/or visual environment during that movement.

According to at least one aspect of the invention, there is provided a magnetic levitation system, which includes a base module having an array of coils spaced in a matrix configuration. The system also includes a platform module having a plurality of focusing magnets and a plurality of lifting magnets. Computer-controlled activation of the array of coils by way of an electric current supplied to the array of coils creates a magnetic field strength which provides a force that levitates the platform module over the base module. The platform module also includes a position and orientation sensing and feedback system.

According to another aspect of the invention, there is provided a method of providing movement by way of magnetic levitation, which includes a step of activating a magnetic base unit with a magnetic platform unit disposed thereabove. The method also includes a step of receiving commands provided by an operator on the magnetic platform unit, the commands corresponding to a desired direction of movement. The method further includes a step of activating a subset of the array of electromagnetic coils on the magnetic base unit in order to provide a magnetic attraction with respect to magnets provided on the magnetic platform unit, to thereby cause movement of the magnetic platform unit in the desired direction of movement.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawings, of which.

DETAILED DESCRIPTION OF THE INVENTION

The present invention is directed to a magnetic levitation and propulsion system that provides for frictionless movement of a platform in at least two dimensions. A magnetic platform hovers over a base array of electromagnets, whereby the platform is levitated due to magnetic levitation principles, and whereby the platform is stabilized with computer-controlled variable current applied to an array of electromagnets provided on the base, based on the mass and inertia placed on the platform. The principle of magnetic levitation is well known in the art, and will not be described in detail below, in order to provide a clear and succinct description of the invention.

Figure 1:
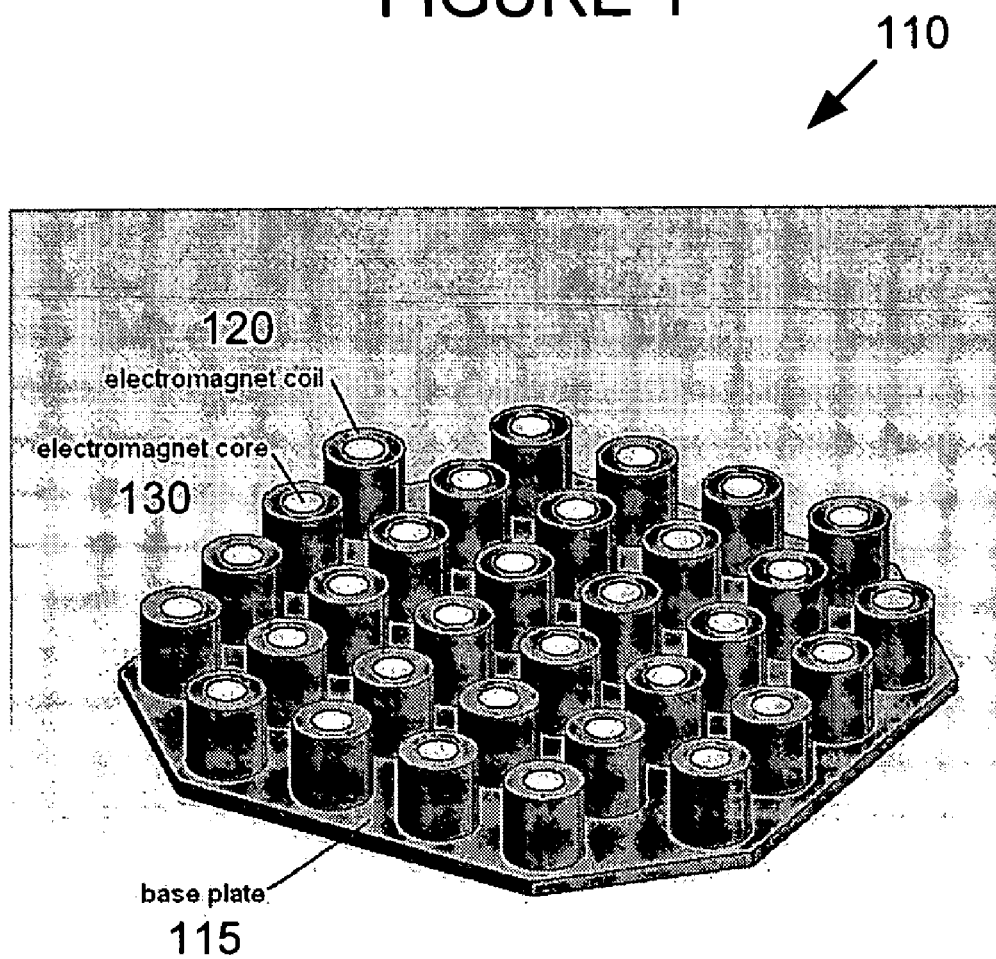
FIG. 1 shows a base module for a magnetic levitation system according to a first and a second embodiment of the invention.

FIG. 1 shows a base module 110 of a magnetic levitation system, according to a first embodiment of the invention, which is also referred to herein as a Magnocarpet. The base module 110 corresponds to a two-dimensional array of electromagnetic coils 120 (with electromagnetic cores 130 that are wrapped around by the coils 120, in order to create a magnetic field), which are disposed on a base plate 115 that is preferably embedded in a carpet. The carpet is not shown in FIG. 1, whereby the carpet preferably has holes sized to accommodate each of the coils 120 of the base module 110. When activated, such as by applying a current to the coils 120 wrapped around the cores 130, the base module 110 creates a magnetic field above it, which is used to levitate a platform that is disposed above the base module 110. The Magnocarpet preferably includes padding (not shown) to provide a smooth surface and a heat sink function for absorbing and dispersing heat generated from the coils and cores away from them. The padding may be provided as part of the carpet covering over and around the coils 120 and cores 130.

The coils 120 are preferably spaced apart from each other by about one to two times the diameter of each coil, whereby each coil is preferably cylindrical in shape and is 50–75 mm in diameter. Each coil is preferably provided with one ampere of current, whereby each coil preferably corresponds to 750 turns of a wire wrapped around a metal core. With such a current applied to each coil, and with 20 to 30 adjacently-positioned coils 120 working together to provide 'lift' for a platform disposed above the coils 120, about 1" to 2" of minimal levitation will be provided for the platform to hover over the base module 110. The field strength provided by the coils and magnets is preferably in a range of from 0.25 to 0.5 Tesla. By way of example and not by way of limitation, resting coil currents are 1 to 2 amperes for levitation, with peaks of 5 to 7 amperes for sudden accelerations, braking, and/or virtual bumps for a "race course" or "ride" provided by way of the base module 110. The values provided above are exemplary, and one skilled in the art will recognize that other values may be utilized, while remaining within the scope of the invention.

Electrical currents are generated in the coils 120 to produce magnetic fields opposing the fields of permanent magnets above them on one or more platform modules, whereby lifting forces are generated with respect to the platform module by magnetic repulsion. Cylindrical iron cores 130 are preferably placed inside the coils 120 to generate a greater magnetic field strength.

The base module 110 also includes a base plate 115, which preferably is a hard plastic or high-density metal (e.g., iron) component and that preferably has a thickness of between 1 and 2". The base plate 115 is used to hold each of the coils 120 and cores 130 in place, as a matrix of coil/core pairs. Each coil 120 corresponds to a wire wrapped around its respective core a number of times (e.g., 750 turns). Each coil/core pair is preferably spaced from its adjacent coil/core pairs by about 1 to 1½".

Figure 2A:
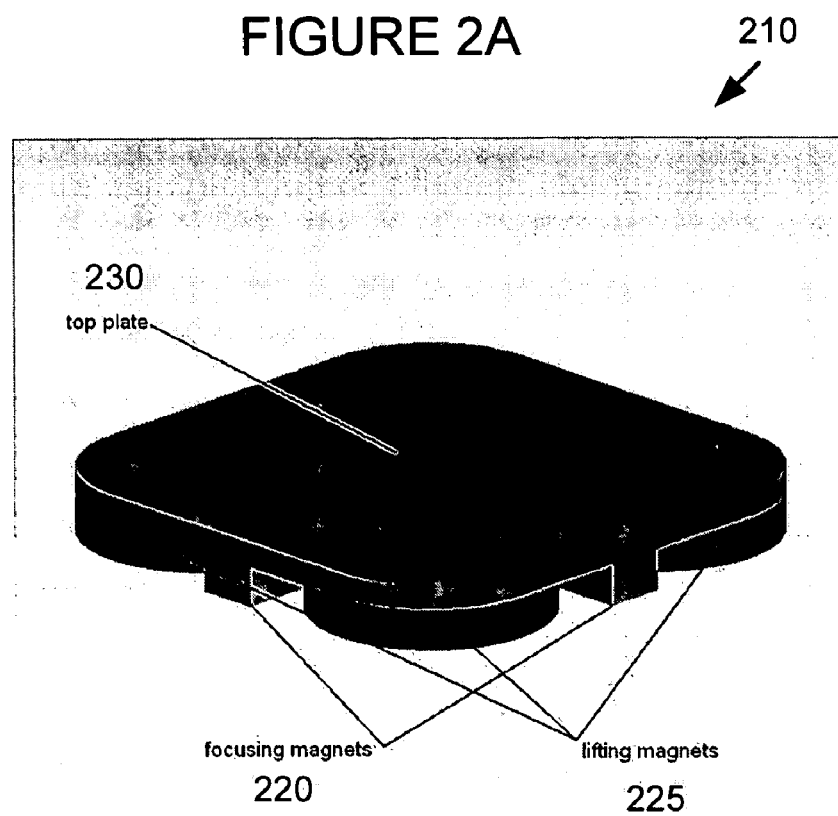
FIGS. 2A and 2B show different views a platform module for the magnetic levitation system according to the first and the second embodiment of the invention.
Figure 2B:
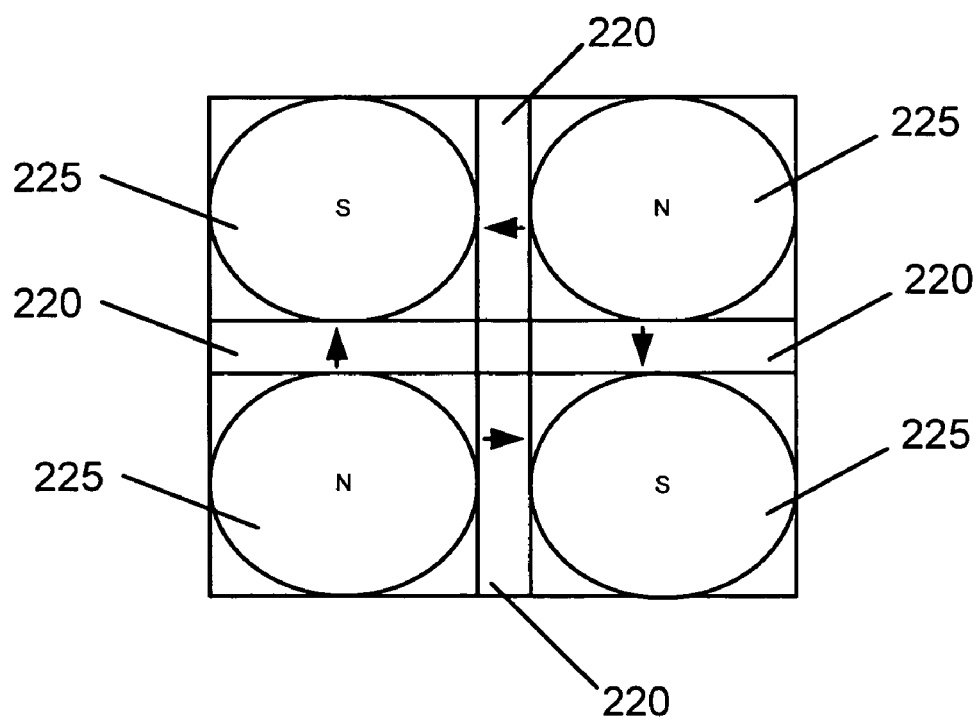

FIG. 2A shows a perspective view of a platform module 210 according to the first embodiment of the invention, whereby the platform module 210 is configured to levitate over the base module 110, and whereby a person is capable of standing or an object is capable of being placed on the platform module 210 and thereby move as the platform module 210 moves in a levitating manner over and across the base module 110. The platform module 210 is also referred to herein as a Magnoboard. FIG. 2B shows a bottom view of the platform module 210, whereby the lifting magnets disposed on the bottom surface of the platform module are provided with opposite polarities with respect to adjacent magnets, in accordance with the first embodiment of the invention. The use of opposite polarities for adjacently-positioned magnets and additional focusing magnets concentrates the magnetic fields generated by the lifting magnets underneath the platform module 210, increasing the available lifting forces as well as improving the stability of the controlled system, as compared to utilizing magnets all with the same polarity (as is done in the second embodiment of the invention, but which provides a simpler control scheme).

In more detail, the platform module according to one implementation of the first embodiment includes four (4) circular-shaped lifting magnets 225 positioned at respective corners of the platform module 210, four (4) focusing magnets 220 with each one positioned between a respective pair of the four lifting magnets 225, and a top plate 230 for providing support for a person (not shown) standing on the platform module 210. The top plate 230 is preferably made out of a ferro-magnetic metal such as iron, and is preferably 0.5–1" thick.

In one possible implementation of the first embodiment, the platform module is two feet wide by two feet long, and thus it has a square shape. Each lifting magnet 225 is preferably 6" in diameter, and each focusing magnet is preferably 2–3" wide by 6" long. One of ordinary skill in the art will recognize that any particular size for the platform module and for the magnets disposed thereon may be utilized while remaining within the spirit and scope of the present invention. For example, the platform module can be sized and shaped to mimic a skateboard or a surfboard or any other type of platform or enclosed pod which may carry items (people, inventory, etc.).

As shown in FIG. 2B, the top-left lifting magnet has a "S" magnetic polarity creating a magnetic field vector along a vertical (up-down) direction, the top-right lifting magnet has a "N" magnetic polarity creating a magnetic field vector along a vertical direction, the bottom-left lifting magnet has a "N" magnetic polarity creating a magnetic field vector along a vertical direction, and the bottom-right lifting magnet has a "S" magnetic polarity creating a magnetic field vector along a vertical direction. The left-side focusing magnet has an upwards magnetic field vector in a horizontal direction, the top-side focusing magnet has a leftwards magnetic field vector in a horizontal direction, the right-side focusing magnet has a downwards magnetic field vector in a horizontal direction, and the bottom-side focusing magnet has a rightwards magnetic field vector in a horizontal direction. These different direction fields provided by the focusing magnets provide a Halbach array, whereby the magnetic-field lines reinforce one another below the array but cancel one another out above the array, while also being capable of providing lateral stability to the platform module.

In more detail, a Halbach array includes a plurality of permanent magnets that are arranged so that the magnetic-field lines reinforce one another below the array but cancel one another out above the array. In one possible implementation, as described in www.skytran.net/press/sciam02.htm, a rectangular array of magnetic bars are provided for a MagLev train, in which the bars are arranged in a special pattern that that magnetic orientation of each bar is at right angles to the orientations of the adjacent bars. With such a configuration, the magnetic-field lines combine to produce a very strong magnetic field below the array, whereby the magnetic field lines cancel one another out above the array.

The lifting magnets 225 provide for the 'lift' or levitation of the platform module 210 over the base module 110, in cooperation with the coils 120 and cores 130 of the base module 110. As explained above, the focusing magnets 220 provide a 'focusing' function to focus the magnetic field strength. In one possible implementation of the first embodiment, the focusing magnets 220 are magnetized along horizontal directions to thereby concentrate the magnetic field underneath the lifting magnets 225 (which are magnetized along vertical directions).

While the first embodiment is shown with four focusing magnets and four lifting magnets as shown in FIGS. 2A and 2B, one of ordinary skill in the art will recognize that other configurations are possible, while remaining within the scope of the invention. For example, a three-by-three array instead of a two-by-two array of focusing magnets and/or lifting magnets may be utilized, or a ring configuration of magnets may be used instead of a matrix array of magnets on the platform module 210.

Figure 3:
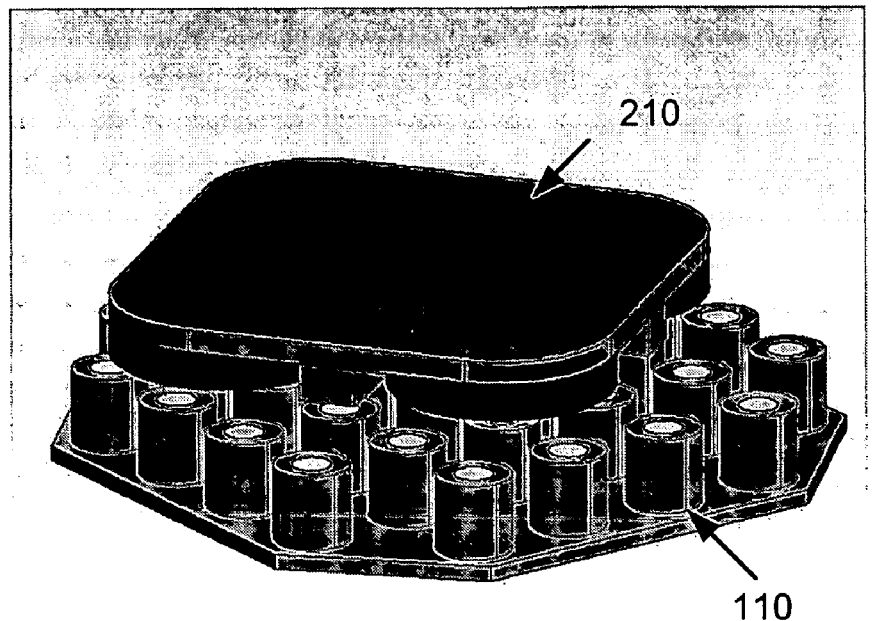
FIG. 3 shows a perspective view of a platform module hovering over a base module according to the first and the second embodiment of the invention.
Figure 4:
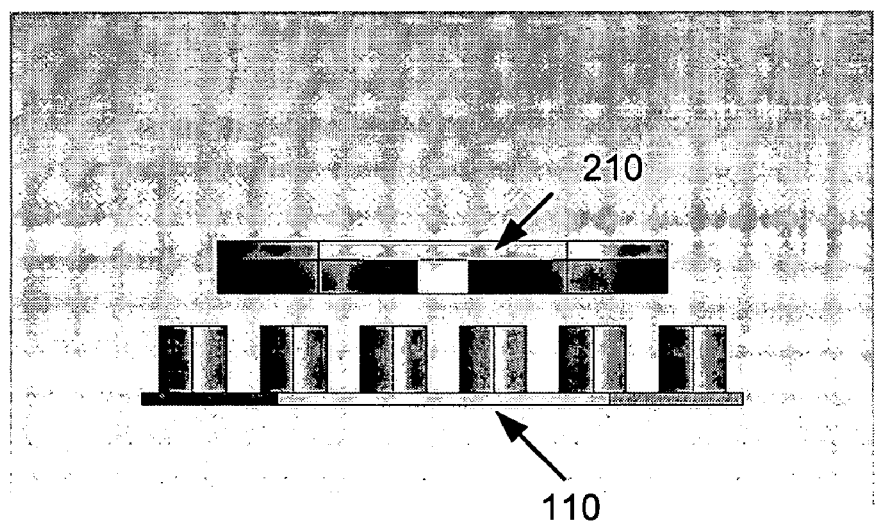
FIG. 4 shows a side view of a platform module hovering over a base module according to the first and the second embodiment of the invention.

FIG. 3 shows a perspective view of a platform module 210 levitating over a base module 110, whereby the distance between the platform module 210 and the base module 110 is based on the force of the magnetic repulsion between the base module 110 and the platform module 210, and whereby they are preferably spaced 1–3" apart from each other. FIG. 4 shows a side view of the platform module 210 levitation over the base module 110, whereby the distance between them is readily discernible in FIG. 4.

In the first embodiment, a software program running on a computer-implemented control unit (not shown, but see FIG. 7) provides control signals to the base module 110, and varies the current applied to the matrix of individual coils 120 of the base module 110. This enables motion control of the platform module 210 as it moves relative to the base module 110. The control signals output by the control unit may be provided to the base module 110 by a wired connection of these two devices, or via wireless means.

The matrix of individual coils 120 and cores 130 of the base module 110 can be programmed to provide a repulsive lift, movement and stability to a levitated platform of opposite polarity magnets, whereby that levitated platform corresponds to the platform module 210. That way, one can simulate a particular racecourse or terrain, such as providing for bumps and curves as a platform module 210 traverses a portion of the base module 110. For example, the base module 110 can be shaped as an "oval race-track", such as one that is 200 feet long by 50 feet wide, whereby users on platform modules 210 can experience effects similar to a go-cart track.

Figure 8A:
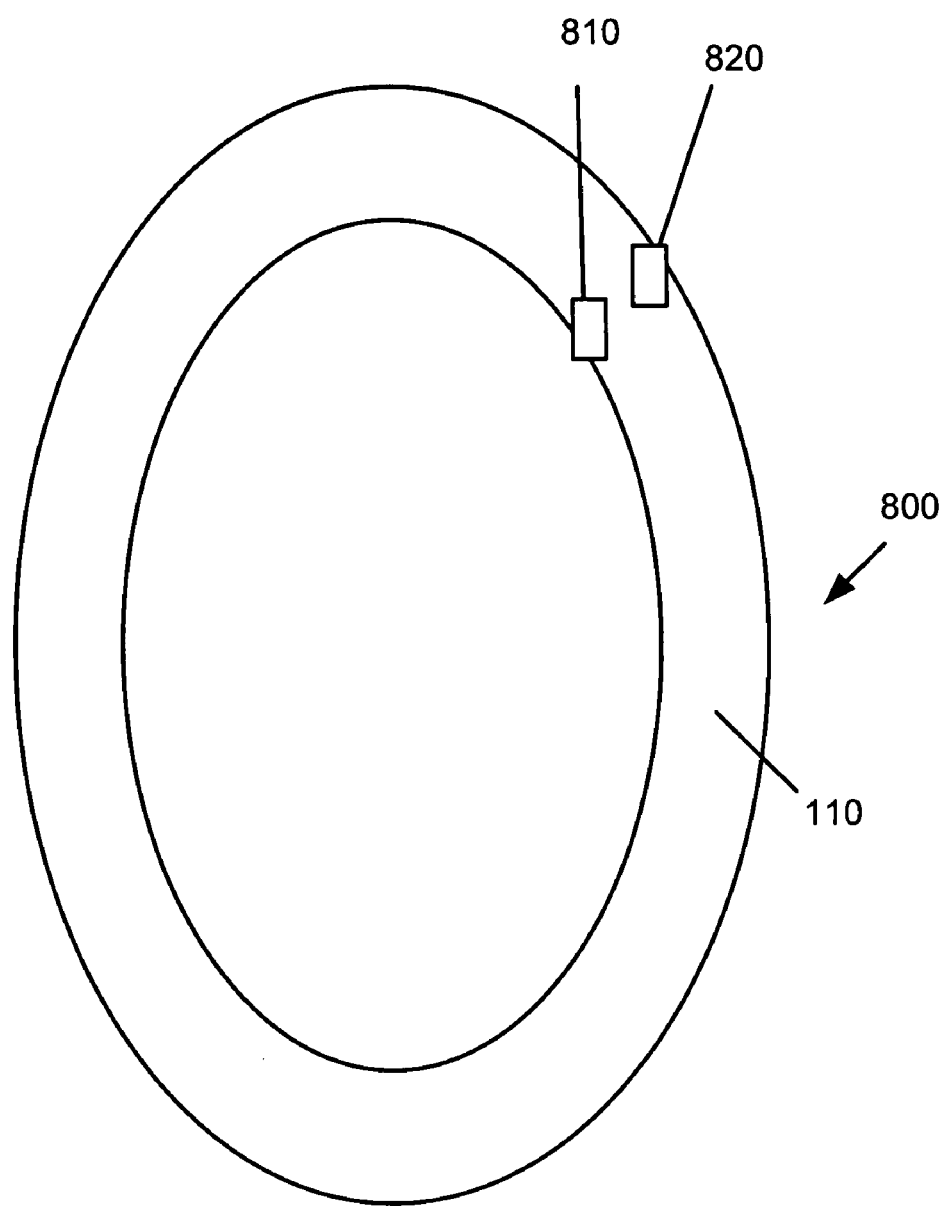
FIGS. 8A and 8B respectively show a top view and a side view of a racetrack configuration of the magnetic levitation system according to the first or the second embodiments of the invention.
Figure 8B:
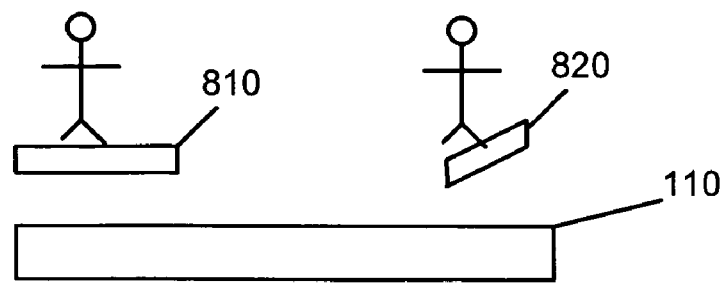

FIG. 8A shows a top view of a go-cart track configuration 800 of the base module 110, and FIG. 8B shows a side view of the go-cart track configuration. A platform 810 on the inside track is provided with a lessening angular tilt than a platform 820 on the outside track (which is higher banked than the inside track). The control unit controls the individual coil/core pairs on the base module 110 to simulate a different type of ride based on where the rider and platform is traversing the base module go-cart track.

Figure 5:
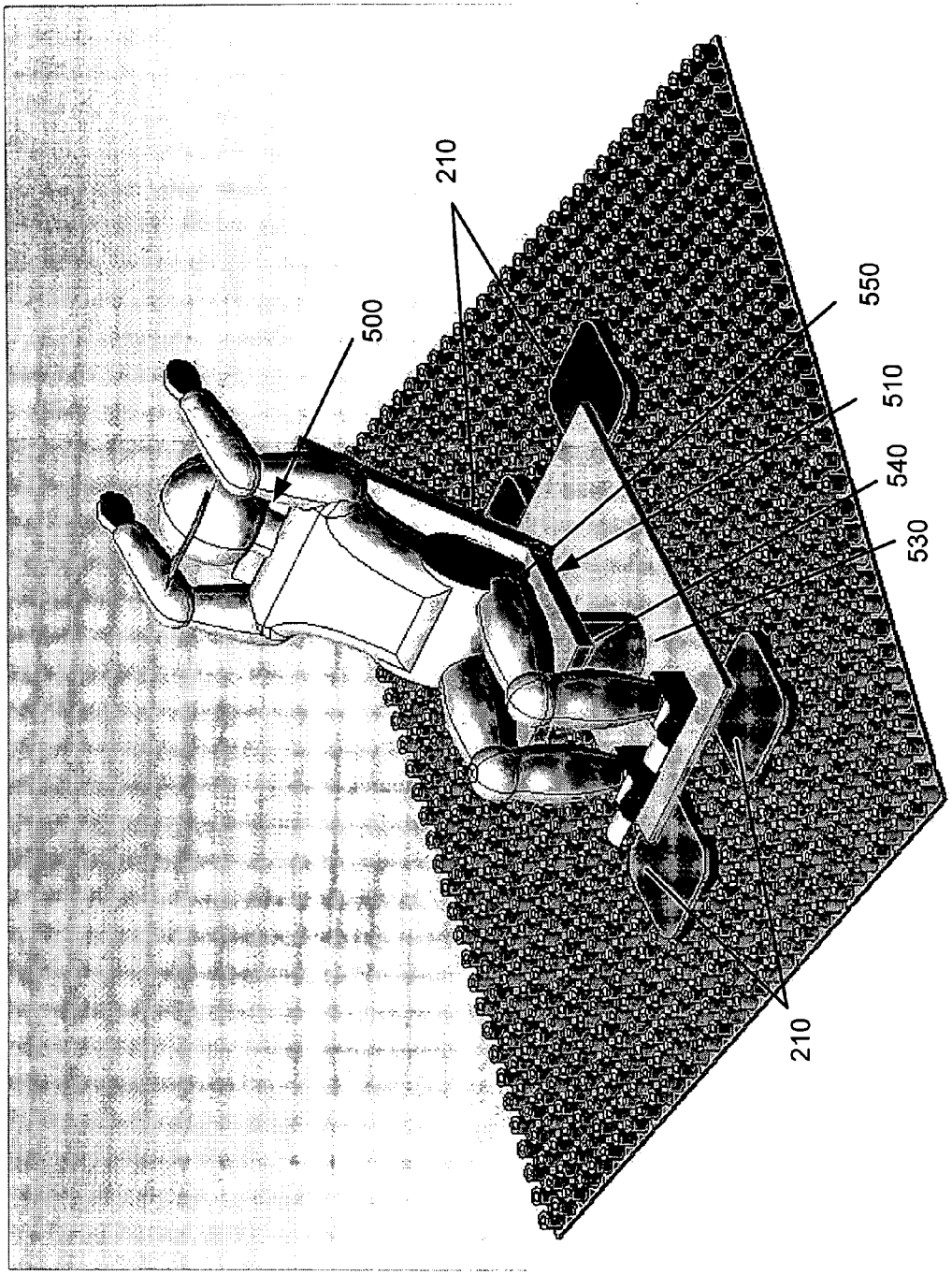
FIG. 5 shows a platform module and base for a magnetic levitation system according to a different implementation of the first and the second embodiment of the invention.

FIG. 5 shows a platform module 510 that is configured to allow a user 500 to sit on it, and to thereby experience a "ride" on the platform module 510 as the platform module 510 is made to traverse a portion of the base module 110, whereby this configuration is also referred to herein as a Magnopod (but not shown is an outer housing enclosing the user 500 within the Magnopod). In FIG. 5, the platform module 510 actually comprises four separate platform modules 210 of the first embodiment, one on each corner of the platform module 510, whereby the four 'corner' platform modules 210 are controlled together in order to cause the platform module 510 to move in a desired direction. The platform module 510 also includes a base plate 530, an adjustable post 540, and a chair portion 550, whereby the user is preferably buckled onto the chair portion 550.

Based on speed and/or direction commands provided by the user, the user can rotate in place as well as move in a forward direction, a rearward direction, leftwards direction, rightwards direction, or combination thereof. In one possible implementation of the first embodiment, the user is provided with a remote control device having a joystick, whereby actuation of the joystick results in the computer system calculating the required currents fed to the array of coils to control movement of the platform module 510 due to particular currents being provided to particular electromagnetic coils of the base module 110.

Alternatively to using a remote control device with a joystick, force sensors (not shown) may be provided on the platform module to detect weight shifts of the rider of the platform module, in order to control the platform module in a manner similar to how a surfboarder rides down a wave on his or her surfboard. Such sensors may detect position of a user and/or weight on respective parts (e.g., right-side, left-side, top-side, bottom-side) of the platform module. Thus, for example, if the rider's weight is detected to have moved to a left side of the platform module, the platform module may be programmed to roll or pitch based on the rider's movement on the platform module, to thereby simulate a person actually riding on a skateboard.

Figure 6:
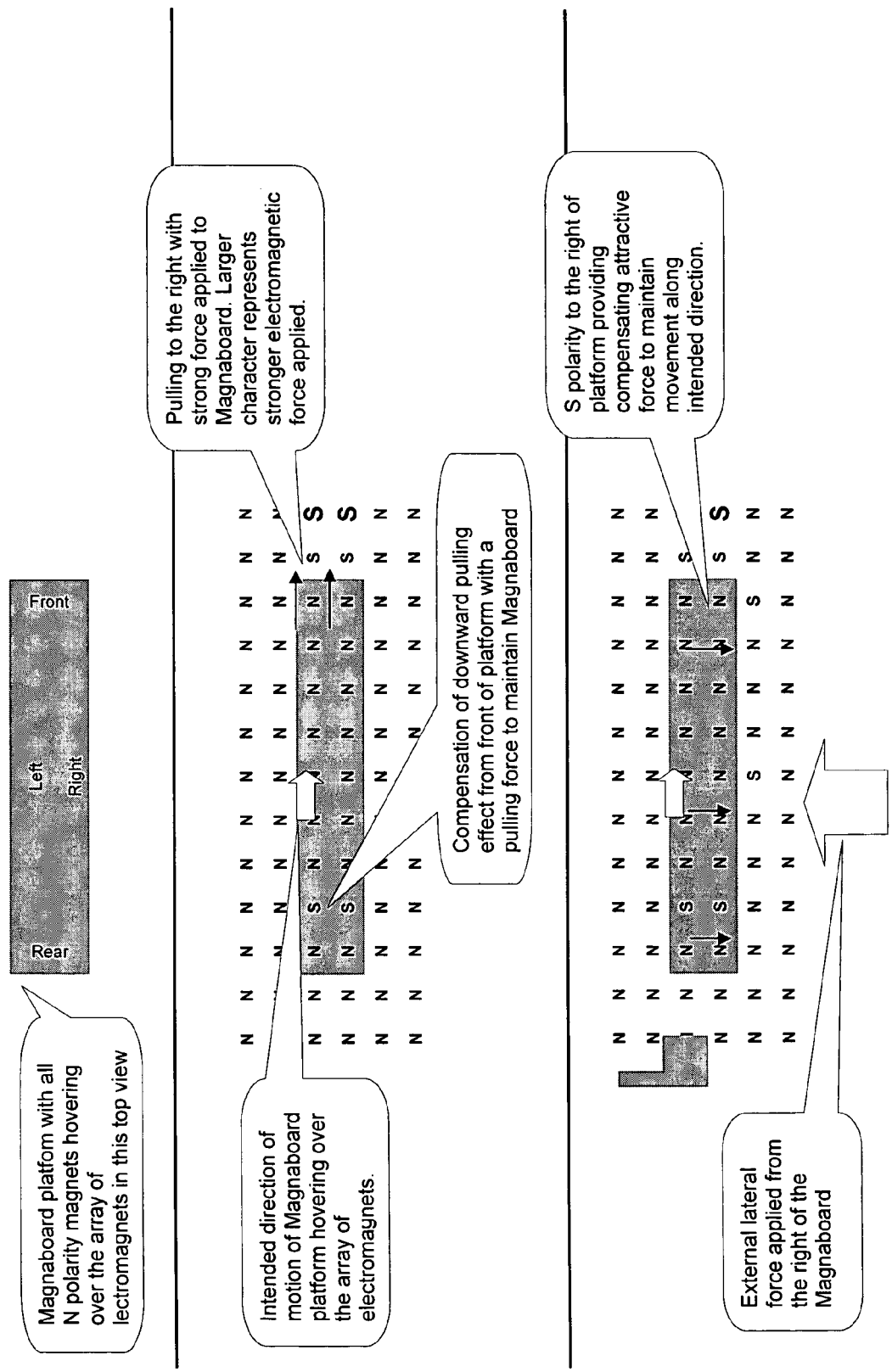
FIG. 6 shows the magnetic polarities of individual coils of a base module to cause linear movement of a platform module, according to the first embodiment of the invention.

Movement of a platform module with respect to a base module will be explained below, with reference to FIG. 6, in accordance with a second embodiment of the invention. The top part of FIG. 6 shows a rectangular platform module positioned over a base module, whereby the platform module is shown by way of the darkened area. The middle part of FIG. 6 shows how movement of the platform module is affected, in this instance, rightwards movement as shown by the arrows in the middle part of FIG. 6. In particular, in a steady state condition in which the platform module is hovering over the base module with no movement, the electromagnetic coils are all of the same polarity as the magnets on the bottom surface of the platform module. In FIG. 6, that same polarity is shown as a North, or "N", polarity, whereby the N-polarized electromagnetic coils beneath the platform module cause a repelling force with respect to the "N-polarized" magnets on the bottom surface of the platform module that faces the base module. In the second embodiment, each of the coils and cores of the base module is programmed as a "N-polarized" magnet, with corresponding "N-polarized" magnets on the bottom surface of the platform module providing the levitation force necessary to maintain the platform module levitated over the base module.

To cause rightwards movement of the platform module as shown in the bottom part of FIG. 6, electromagnetic coils that are disposed directly beneath and to the right of where the platform module is currently hovering, have their polarities changed to "S", so as to cause an attractive force with respect to the N-polarized magnets on the bottom surface of the platform module. This results in the platform module being pulled in a rightwards direction towards those S-polarized electromagnetic coils of the base module. Note that the electromagnetic coils that are positioned directly beneath and to the right of where the platform module is currently located are not all provided with the same magnetic force, whereby the two electromagnetic coils further to the right of the two electromagnetic coils immediately to the right of where the platform module is currently hovering over, have a stronger S-polarity magnetic field. This causes the desired rightwards pulling effect on the platform module, thereby causing it to move relative to the base module.

In order to counter a dipping or pitching effect that may occur due to the attraction of the platform module to the electromagnetic coils disposed on the base module that are beneath and directly rightwards of the platform module, the middle part of FIG. 6 also shows leftwards-positioned electromagnetic coils also being S-polarized (but at a lesser strength than the rightwards-positioned electromagnetic coils). This counter-force provides compensation for the rightwards and downwards pulling force on the platform module, to thereby maintain the platform module in a level disposition as it moves above the base module. The amount of force to be provided to the leftwards-positioned electromagnetic coils can be determined by experiment and/or by simulation by one skilled in the art.

The bottom part of FIG. 6 shows a configuration in which the base module can be programmed to provide various simulated forces, such as wind, air resistance, inertial changes, to an operator on the platform module, to thereby simulate real-life situations. For example, a Northerly wind is simulated by way of programming electromagnetic coils positioned to the South of where the platform module is currently located, to have an attractive force (e.g., "S-polarized") so as to result in the platform module being pushed northwards (due to the simulated wind) as the platform module moves in the rightwards direction.

In the first embodiment of the invention, movement of the platform module is effected by enabling particular coil/core pairs on the base module adjacent to each lifting magnet in an opposite polarity with respect to its adjacent lifting magnet, in order to cause movement of the platform module in a desired direction. For example, to cause rightward movement of a platform module according to the first embodiment, coil/core pairs adjacent to and immediately to the right of where a particular lifting magnet of the platform module is currently hovering over are controlled so that they will have an opposite polarity (e.g., "S") from that adjacent lifting magnet ("N"), whereby coil/core pairs adjacent to and immediately to the right of where a different lifting magnet (having "S" polarity) of the platform module is currently hovering over are controlled so they will have an opposite polarity (e.g., "N") from that adjacent lifting magnet. While the control scheme for causing movement of the platform module is a bit more complicated in the first embodiment as compared to the second embodiment, the use of different-polarized lifting magnets on the platform module does provide for a more efficient and stable system.

In the first or the second embodiment, directional stability is maintained by a computer system applying a constantly varying, high frequency pattern to the matrix of electromagnetic coils of the base module, in order to simulate a particular terrain or other type of condition. In one possible implementation of the first and the second embodiment, the frequency rate is varied at a value between 20 to 1000 Hz, so as to maintain platform stability. One of ordinary skill in the art will recognize that other update rates may be envisioned while remaining within the scope of the invention.

Other types of effects can be simulated by one riding on a platform module. By way of example, bumps in a terrain can be simulated by having particular groups of electromagnetic coils having a higher or lower magnetic field than other adjacent electromagnetic coils on the base module. That way, when the platform module rides over those group of electromagnetic coils having a stronger N-polarized field strength, for example, the platform module will "ride the crest" over a bump created by this increased magnetic field strength. Race courses may be patterned for participants on their own platform modules, whereby the actual race conditions may be kept secret from the race participants until they come in view on an enclosed video game type visualization system, for example.

In one possible implementation of the second embodiment, a user standing on a platform module is provided with a hand-held remote control device that allows the user to move the platform module in a particular direction. For example, in the example of FIG. 6, the user has operated the remote control device (e.g., joystick) to move in a rightwards direction, whereby those signals are received by a control unit in a wireless manner, and that results in control signals being provided to particular electromagnetic coils of the base module in order to cause the desired motion sought by the user.

In one possible implementation of the first embodiment, when a user first stands on the platform module, a sensor (not shown) on the platform module senses the total weight on the platform module, to thereby provide information to a control module to be used to control the amount of magnetic force necessary to maintain the user in a levitated manner above the base module. For example, a 60-pound child riding on a platform module will not require the same magnetic field strength as a 240-pound adult riding on a platform module. The amount of magnetic field strength to maintain the platform module-with-user in a levitated state can be determined by simulation and/or by experiment with an adaptive computer program obtaining data from positioning sensors.

Figure 7:
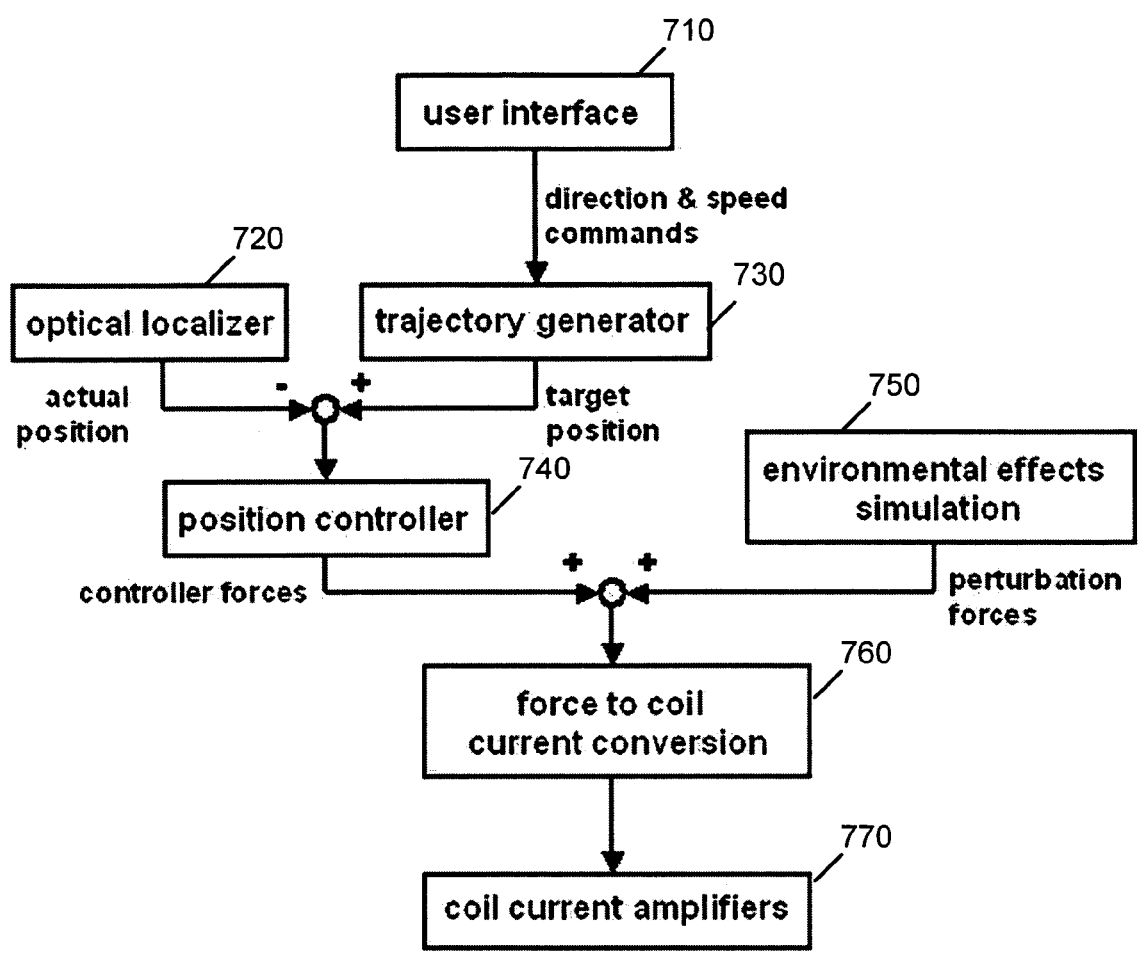
FIG. 7 is a block diagram of the components that can be used in a magnetic levitation system according to any of the embodiments of the invention.

FIG. 7 shows a block diagram of an adaptive magnetic levitation control system 700 that can be used to control the magnetic levitation system according to the first or the second embodiment of the invention. The magnetic levitation control system 700 includes a user interface 710, an optical localizer 720, a trajectory generator 730, a position controller 740, an environmental effects simulation unit 750, a force-to-coil current conversion unit 760, and a coil current amplifiers unit 770. The output of the coil current amplifiers unit 770 is provided to respective coils of a base module being controlled by the magnetic levitation control system 700.

The user interface 710 may include any combination of input devices such as a joystick, steering wheel, pedals, or sensing devices detecting intended motions of the riders. The output of these devices is interpreted as direction and speed commands for the trajectory generator unit 720.

The trajectory generator unit 730 calculates desired trajectories for all degrees of freedom in position and orientation of the levitated platform in real time (e.g., at a rate of from 100–1000 Hz) given the layout of the Magnocarpet, current state of the platform, dynamic simulation of the suspension of the virtual vehicle, preprogrammed and measured trajectories, and user interface inputs. The trajectory generator unit 730 utilizes a computer, or processor, for making the desired trajectory calculations.

The optical localizer unit 720 calculates the position and orientation of one or more levitated platforms by triangulation of the position of light emitting diodes (LEDs) or reflectors (not shown) attached to the bottom surfaces of the platforms, whereby light detectors placed throughout the base module pick up light output by the LEDs on the platform modules, in order to determine an exact position of the platform modules at any given instant in time. Other types of position detection schemes may be envisioned, such as by using radio frequency signals, ultrasonic signals, acoustic signals, or other types of detection signals, while remaining within the scope of the invention. A position and orientation update rate of 100–1000 Hz is utilized in one possible implementation.

The position controller 740 calculates required actuation forces from desired trajectory, position error, and levitated inertia.

The environment simulation unit 750 calculates perturbation forces based on dynamic models of the simulated vehicle and environment, generating effects such as wind gusts, wheel spin on gravel or mud, wave motion, etc.

The force-to-coil current conversion unit 760 calculates individual coil currents to generate desired forces on the levitated platform, given detailed magnetic field models stored in a memory (not shown) of the force-to-coil current conversion unit 760. It also monitors a thermal model of individual coils to prevent overheating. The force-to-coil current conversion unit 760 utilizes a computer, or processor, for calculating the coil current values, and for determining the thermal characteristics of the coils.

The coil current amplifiers unit 770 includes a plurality of power amplifiers that generate currents to the coils of the base module.

In the first and second embodiments, sensing and feedback of the position and orientation of the platform module are utilized to provide stable levitation. The position controller 740 reads the position data, provided by way of sensors (not shown) disposed throughout the base module, and calculates the coil currents necessary to levitate and move the platform module on a target trajectory, at a preferably rate of 100 to 1000 Hz. In one possible implementation of this embodiment, proportional-integral-derivative (PID) error feedback control is utilized with feedforward terms for gravity loading and inertial acceleration, and with adaptive terms to compensate for the mass and center of inertia of different riders (e.g. riders standing straight up on the platform and riders crouching down while standing on the platform).

The platform controller is configured to decouple all of the degrees of freedom of the platform module and rider about the center of mass of the system, in order to simplify the control system and improve stability.

In the first and the second embodiments described above, when the user provides a command to move the platform module in a particular direction, the platform module reacts based on the coils on the base module that it is adjacently positioned over, whereby "random" effects such as wind, can be programmed into the coils of the base module using a random number generator, for example, in order to change the ride from one rider to the next rider over the same area of the base module. The environmental effects simulation unit 750 is capable of providing such random or pseudo-random changes in the riding environment of the platforms over the base module.

In a third embodiment of the invention, the user is not provided with a remote control unit, but rather a preprogrammed course is prepared on the base module, and whereby the platform module is levitated through the pre-programmed course by an attraction force provided by way of particular coils on the base module having particular polarities (see FIG. 6, for example), to thereby experience a somewhat unexpected and hopefully fun ride. The user may be provided with a remote control unit in an alternative implementation of the third embodiment, to allow the user order to control the speed (but not the path) that the user traverses the course.

In any of the embodiments described above, safety factors have to be considered. For example, the maintaining of the platforms over the base module at all times is preferred, such as providing a magnetic barrier at the circumference of the base module in order to prevent the platform modules to veer outside of a space above the base module. Also, if more than one user on a platform is riding on a base module, proximity controls should be implemented in order that collisions do not occur between riders.

In another embodiment of the invention, called "MagnoStripes", a set of parallel permanent magnetic paint strips with polarity changes along the longitudinal axis are used in conjunction with concrete or asphalt roadways, in order to allow for users to travel to different places on those roadways using magnetic levitation principles. This embodiment can be used with something called "MagnoVehicle", which is a platform with retractable wheels with a 2D matrix of electromagnets coils and on-board power supply. A computer software program is utilized to vary the current applied to the coils to create motion in a linear direction along a "MagnoStripes" roadway, such as in a manner as described previously with respect to the first or the second embodiments.

The present invention can be used with a computer-controlled software management system that simulates surface environment in virtual landscapes, such as, but not limited to: A) virtual surface conditions (gravel road, oil slide, ice patches, grass, dirt, logs, rocks etc.); B) simulation of vehicle/surface interaction: skid, slip, wheel spin; C) virtual water surface (wave height & direction); D) water/vehicle interaction: buoyancy, hydroplaning; and E) virtual wind (direction, intensity, gusts) with variable lift and lateral accelerations over short time frames.

One can also simulate and augment curving roads as MagnoBoards turn on MagnoCarpet by producing higher lift on one side of a MagnoBoard's longitudinal axis and increasing angle of bank in the interior of a MagnoPod. In another possible implementation of this embodiment, a virtual race course can be built on a surface of elastic ball bearings that react to compression with a greater expansion force than traditional gravity or natural springs or shock absorbers would normally respond.

In the present invention, different types of vehicles can be simulated by using the magnetic levitation system of at least one embodiment of the invention. Multiple types of vehicle types based on a platform chassis and software control mechanism can support multiple chassis, including, but not limited to: magnoskateboard, magnoracecar, magnojetski, magnogokart, magnohorse/saddle, magnofantasyanimal, etc.

The present invention can also be used to simulate various virtual chassis suspensions/shock absorbers over variable surface conditions. It can be used to simulate various virtual tires that interact differently with various road conditions. It can be used to simulate various virtual hydrofoil types on virtual boats. It can be used to simulate new forms of virtual propulsion systems that are not physically possible such as a MagnoTrain held together by virtual bungee cords, chains, links, etc.

The present invention can also be used with a computer software control and image library system that creates a real-time virtual landscape and environment that is projected onto a set of one or more internal video/display/projection/ surface screens within a MagnoPod. For example, the user of the Magnopod may be provided with a 3D graphical environment using stereovision goggles or liquid crystal diode (LCD) shutter glasses, and audio effects for immersive environments. By way of example, the interior of the MagnoPod may include sound system and high speed air fans with temperature control to interior conditions and augment user experience.

Also, instead of using a Magnoboard, a user may wear a suit, called a Magnosuit, that is constructed to include lifting magnets and focusing magnets, so that the user can levitate and move over a Magnocarpet. Similarly, a Magnosuit of individual components can be attached at various places along the body such as a breast plate, thigh pads, shoes and gloves, to provide (in this example) areas of support all independently controlled and supported.

In yet another embodiment, a MagnoBoard can be provided over a MagnoBoard, with a user standing on the top MagnoBoard, in order to provide a system having coarse-fine redundant actuation.

At least one embodiment of present invention is designed to be modular and easily reconfigurable. Multiple base modules and platform modules may be joined together in arbitrary configurations to represent various simulated terrain courses and vehicles. The control software is preferably modular and easily reconfigurable as well.

Also, in at least one of the embodiments of the invention described above, sensing and feedback control is performed at a periodic rate, such as between 100 to 1000 Hz, so as to achieve stable magnetic levitation.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A magnetic levitation system, comprising:
    a base module having a plurality of coils spaced in a matrix configuration; and
    a platform module having a plurality of focusing magnets and a plurality of lifting magnets;
    a control unit configured to provide control signals corresponding to different current amounts to individual ones of the plurality of coils, in order to simulate a particular environmental effect as the platform module moves over portions of the base module,
    wherein activation of the plurality of coils by way of computer controlled electric current supplied to the plurality of coils creates a magnetic field strength which provides a force that levitates the platform module over the base module.

2. The magnetic levitation system according to claim 1, further comprising:
    a plurality of cores on the base module, wherein the plurality of coils are respectively wound around the plurality of cores, to thereby provide magnetic field creating components.

3. The magnetic levitation system according to claim 1, further comprising:
    a top plate provided above the focusing magnets and the lifting magnets, the top plate being a ferromagnetic metal material to thereby cause the magnetic field to stay between the base module and the platform module.

4. The magnetic levitation system according to claim 1, further comprising:
    a sensing and feedback control unit that outputs sensing signals corresponding to the platform module position and orientation at a periodic rate, so as to achieve stable magnetic levitation of the platform module.

5. The magnetic levitation system according to claim 1, wherein the environmental effect is at least one of: a) terrain and b) wind.

6. The magnetic levitation system according to claim 1, further comprising:
    a receiving unit configured to receive commands provided by an operator on the platform module, the commands corresponding to a desired direction of movement.

7. The magnetic levitation system according to claim 6, wherein the commands are provided to a control unit by way of wireless communications.

* * * * *